M. G. LAWRENCE.
FISHHOOK HOLDER.
APPLICATION FILED MAR. 31, 1920.
1,365,111.
Patented Jan. 11, 1921.
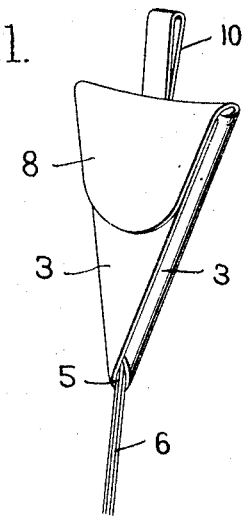
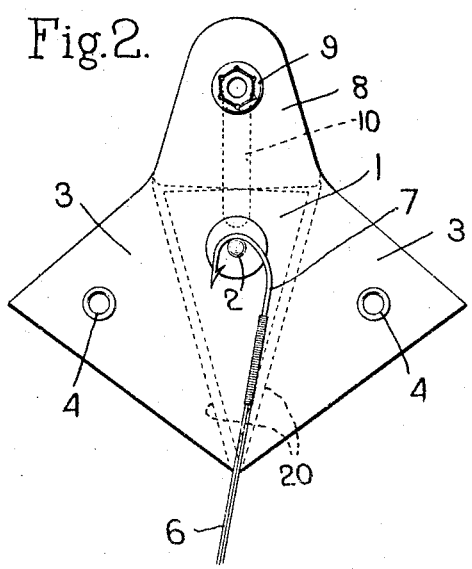
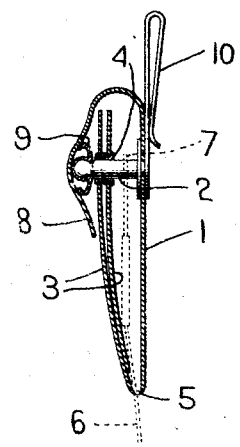
Inventor.
Melvin G. Lawrence
by Heard Smith & Tennant.
Attys.

UNITED STATES PATENT OFFICE.

MELVIN G. LAWRENCE, OF REVERE, MASSACHUSETTS.

FISHHOOK-HOLDER.

1,365,111.  Specification of Letters Patent.  Patented Jan. 11, 1921.

Application filed March 31, 1920. Serial No. 370,098.

*To all whom it may concern:*

Be it known that I, MELVIN G. LAWRENCE, a citizen of the United States, residing at Revere, county of Suffolk, State of Massachusetts, have invented an Improvement in Fishhook-Holders, of which the following description, in connection with the accompanying drawing, is a specification, like characters on the drawing representing like parts.

This invention relates to fish hook holders and has for its object to provide a novel holder in which fish hooks can be readily carried about without danger that they will become entangled in or caught by any article. The novel features wherein my invention resides will be more fully set forth in the appended specification and claims.

In the drawings wherein I have shown a selected embodiment of my invention, Figure 1 is a perspective view of a fish hook holder constructed in accordance with my invention;

Fig. 2 is a view showing the holder opened out and in the position it would assume when fish hooks were being placed therein or removed therefrom.

Fig. 3 is a central sectional view through a fish hook holder embodying my invention.

My improved holder may be made of any suitable material and it comprises a back section having a fish-hook-receiving stud rising therefrom, side sections, and a folding top section adapted to detachably engage the stud. The side sections are separated from each other at one end to allow a passage or opening to receive the snoods of the fish hook. When the fish hooks are hooked around the stud and the top is folded over onto and detachably connected to the stud, said stud holds the fish hook firmly in place and prevents any possibility of the fish hooks being drawn out through the opening between the sides.

In the construction shown in the drawings the back of the holder is indicated at 1, it having a stud 2 rising therefrom. This stud may be fastened to the back in any suitable way without departing from the invention. Secured to the back are two side sections 3 which, in the construction shown, are adapted to fold over onto the back, said side sections having eyelets or apertures 4 to receive the stud. These side sections 3 may be connected to the back section in any suitable way. It is, however, convenient to make the back and side sections from one piece of flexible material so that the side sections can be folded along the dotted lines 20 to overlie the back section. The back section and the side sections are preferably made triangular in shape, although this particular shape is not essential.

When the side sections are folded over each other there will be an opening 5 formed at the end of the holder through which the snoods 6 of the fish hook 7 may pass. The fish hooks, it will be observed, are hooked around the stud 2 and are retained in place thereby. The holder also comprises a cover or top section 8 which is foldable over the sides and is provided with means for being detachably connected to the stud 2. This top section 8 may also be made integral with the back 1, and, as the material of which it is made, is flexible, it can be easily folded over onto the side sections.

The top section 8 is provided with a fastener 9 preferably in the form of a glove fastener adapted to detachably engage the end of the stud 2.

In using the device it is opened out into the form shown in Fig. 2 and the fish hooks are then placed around the stud 2 after which the sides 3 are folded over each other and the eyelets 4 are inserted over the stud and then the top 8 is folded down and the fastening 9 detachably secured to the end of the stud. The fish hooks are held on the stud by the sides and top and any pulling strain on the snoods will be taken entirely by the stud 2. Therefore, since the fish hooks are always hooked onto the stud, it will not be possible to draw the fish hooks out through the opening 5, nor can the points or barbs of the fish hooks become caught in the sides of the holder. If desired, the holder may be provided with a spring clip 10 by which it may be fastened to the edge of a person's pocket or to his belt.

An important feature of my invention is the stud extending from the back transversely through the holder and having detachable engagement with the top so that when the fish hooks are placed around the stud, said stud will take any pulling strain which may be applied to the snoods and thus prevent any possibility of the fish hooks from being withdrawn from the holder or caught in the sides thereof.

While I have shown and illustrated a holder made of one piece of flexible material, yet this particular shape is not essential to the invention and the holder may be made in various ways without departing from the invention.

I claim:

1. A fish hook holder comprising a back member having a hook-retaining stud extending therefrom, sides which are spaced from each other at one end to provide an opening to receive the snoods of the fish hooks which are placed around the stud, and a foldable top section or cover having provision for detachably engaging the stud.

2. A fish hook holder comprising a back member having a hook-retaining stud extend therefrom, two side sections foldable over the back section and each provided with an aperture to receive the stud, said side sections being separated at one end of the holder to form a snood-receiving opening, and a top or cover section foldable over the folded side sections and having provision for detachably engaging the stud.

In testimony whereof I have signed my name to this specification.

MELVIN G. LAWRENCE.